(12) United States Patent
Merrett

(10) Patent No.: US 6,409,274 B1
(45) Date of Patent: Jun. 25, 2002

(54) APPARATUS AND METHOD FOR UNLOADING PARTICULATE MATERIAL FROM CONTAINERS

(75) Inventor: Ronald G. Merrett, Harris County, TX (US)

(73) Assignee: Intermodal Container Systems, Houston, TX (US)

( * ) Notice: Subject to any disclaimer, the term of this patent is extended or adjusted under 35 U.S.C. 154(b) by 0 days.

(21) Appl. No.: 09/629,753

(22) Filed: Jul. 31, 2000

(51) Int. Cl.[7] .................................................. B60P 1/04
(52) U.S. Cl. ........................ 298/17 R; 220/1.6; 406/39; 406/93
(58) Field of Search ........................ 298/17 R; 220/1.6, 220/601; 406/39, 43, 93, 95, 170, 192; 222/92

(56) References Cited

U.S. PATENT DOCUMENTS

| | | | |
|---|---|---|---|
| 3,744,653 A | * | 7/1973 | Jensen ...................... 298/17 R |
| 4,875,811 A | | 10/1989 | Merrett et al. |
| 5,096,336 A | | 3/1992 | Merrett et al. |
| 5,378,047 A | | 1/1995 | Merrett et al. ............ 298/17 R |
| 5,487,485 A | * | 1/1996 | Yang et al. ............... 220/1.6 X |
| 5,749,683 A | * | 5/1998 | Kunse ....................... 406/43 X |
| 5,975,642 A | * | 11/1999 | Dibble et al. ............. 298/17 R |

* cited by examiner

*Primary Examiner*—Stephen T. Gordon
(74) *Attorney, Agent, or Firm*—Loren G. Helmreich; Browning Bushman P.C.

(57) ABSTRACT

Container (10) has a plastic bag (26) filled with a particulate material and sealed within the plastic bag (26). A rear bulkhead (42) at the rear end of the container is positioned adjacent the plastic bag (26) and a tubular discharge fitting (50) is mounted on bulkhead (42). A vacuum unloading device (58) has a pair of rigid conduits (60), (62) secured to each other in a perpendicular relationship. Unloading device (58) is arranged for connection to discharge fitting (50) by coupling (66) and adaptor (72). Upon slitting or puncturing of the plastic bag (26) and tilting of the front end of container (10) about the rear end thereof above the angle of repose of the particulate material being unloaded, the particulate material is discharged by gravity into the vacuum unloading device (58). The particulate material is drawn by a vacuum through conduit (60) into pneumatic conduit (62) for transport to a suitable storage facility.

8 Claims, 4 Drawing Sheets

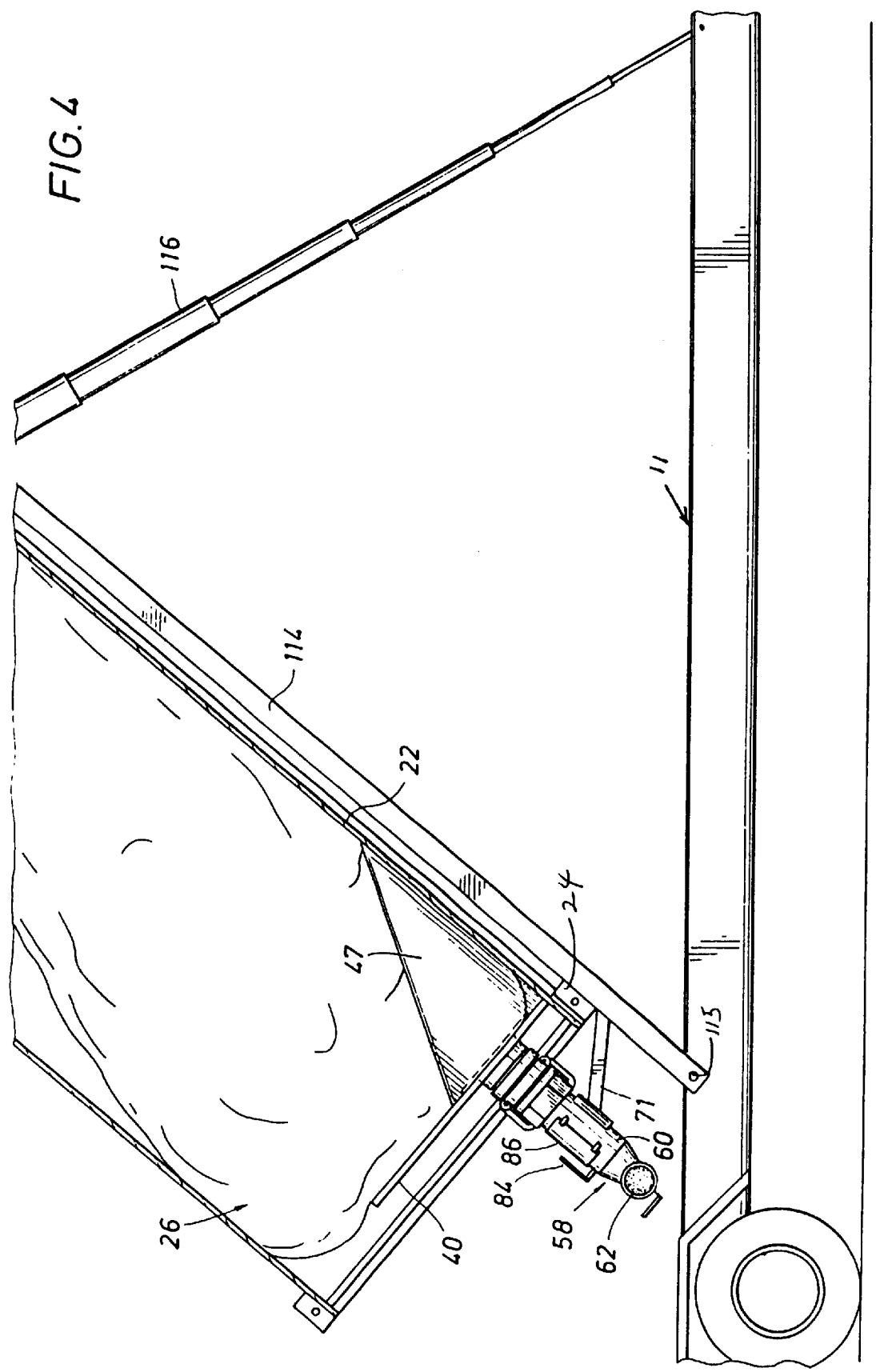

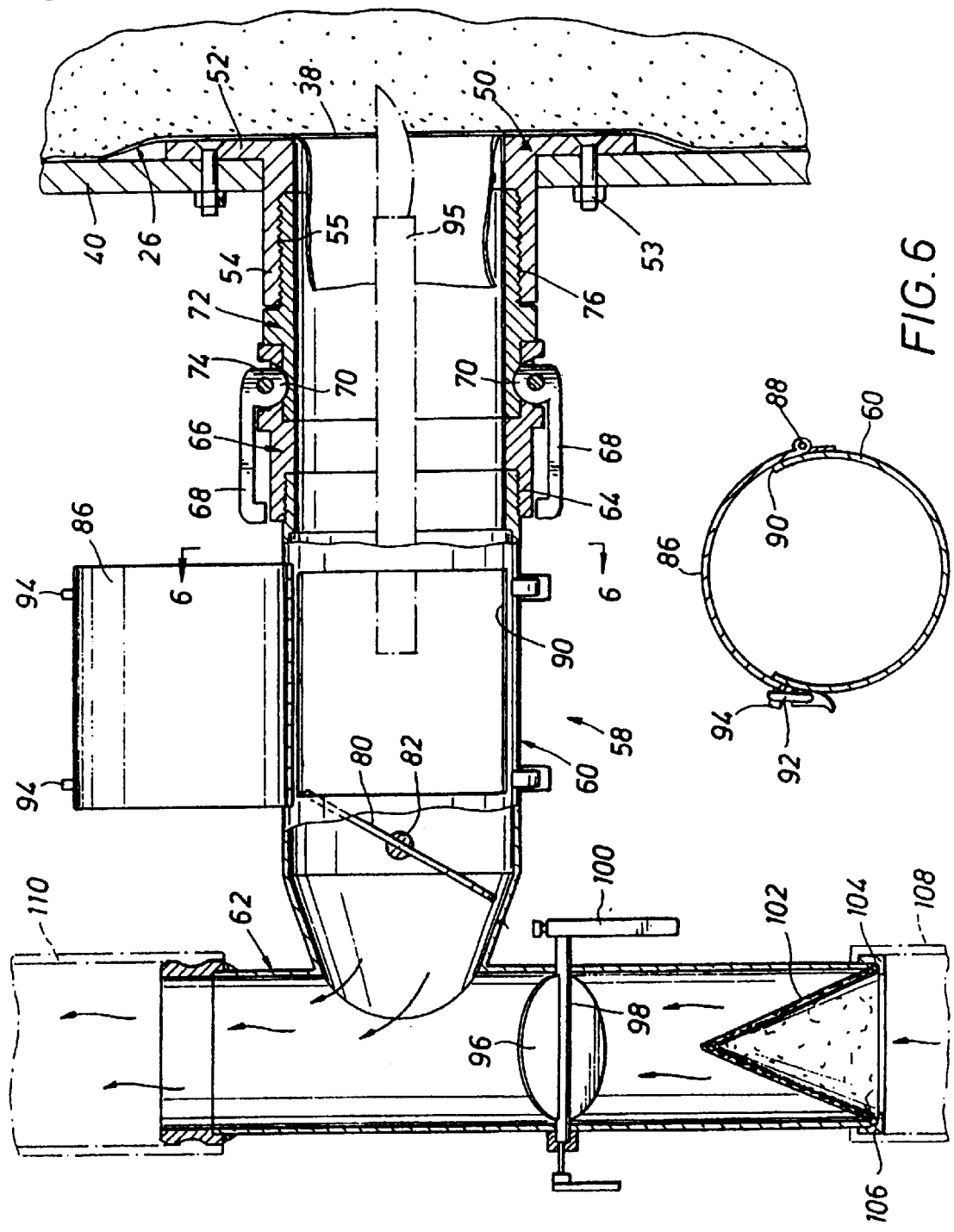

APPARATUS AND METHOD FOR UNLOADING PARTICULATE MATERIAL FROM CONTAINERS

FIELD OF THE INVENTION

This invention relates to a container unloading system for gravity unloading of particulate lading or material at an unloading site, and more particularly to an apparatus and method for a container unloading system for the unloading of particulate lading from a container at the unloading site upon upward tilting of the front end of the container.

BACKGROUND OF THE INVENTION

Particulate loadings, such as polycarbonate or thermoplastic materials, synthetic resins, for example, are normally loaded within boxes, bags, containers or the like at the site where the polycarbonate plastic material is manufactured, and then transported by wheeled vehicle to a site where the plastic material is unloaded from the container into a storage facility for subsequent use in the manufacture of various plastic end products. It is highly desirable that such plastic materials or ladings, such as polyethylene pellets, not be contaminated by foreign matter or the like as even small amounts of foreign matter or contamination affect the quality of the subsequent manufactured products. Heretofore, plastic liners or bags such as vinyl or polyethylene liners have been used within containers to protect the lading from contamination. The plastic liners are normally sealed at the initial loading site and the lading is maintained in sealed relation within the plastic liner until unloaded at the unloading site, thereby insuring that the plastic lading will not be contaminated. Normally, the plastic lading is unloaded at the unloading site from the container by a suction or vacuum line extending within the container and then is conveyed pneumatically to a storage facility, such as bins, silos, or the like, until needed for the production of plastic end products. Pressurized air is sometimes used to push or aid in pushing the particulate material into the storage facility.

Heretofore, such as shown in U.S. Pat. No. 4,875,811 dated Oct. 24, 1989, U.S. Pat. No. 5,096,336 dated Mar. 13, 1992 and U.S. Pat. No. 5,378,047 dated Jan. 3, 1995, a container has been used in intermodal transportation by mounting on railway flat cars, container ships, or highway trailers, for example, for the transport of particulate material with the particulate material being sealed in a flexible bag within the container and then unloaded at an unloading site by tilting of an end of the container. The transportation system illustrated in U.S. Pat. No. 4,875,811 transports particulate material in a sealed condition from one location or site where the particulate lading is loaded into a container having a liner or bag therein, to another location or site where the sealed liner or bag within the container is broken for unloading of the particulate lading from the container into a storage area. Such a system is utilized also for the transport of other various particulate materials, such as, for example, granular or powdered materials used in foodstuffs.

The container after being loaded and sealed at the first site is transferred to a tiltable container support frame on a highway vehicle for transport to the second site where the sealed container is broken and then tilted by a tiltable support frame to an angle above the angle of repose of the lading within the container for discharge of the lading by gravity from the container into a pneumatic discharge line for pneumatic conveying to a suitable storage facility, such as a storage bin or silo.

One end of the container has a pair of rear doors which are normally latched in closed position during transit. The bag fitting between a pair of end bulkheads is filled with lading from a flexible hose extending within an upper tubular inlet extension or neck of the bag. Upon filling of the bag with lading the bag is urged against the end bulkheads and the extending tubular extension is sealed by suitable banding or ties. Thus, the lading is sealed within the bag for transport to an unloading site.

The loaded container as illustrated in U.S. Pat. No. 4,875,811 is then transferred to a tiltable container support frame pivotally mounted on a highway trailer body and is releasably secured thereon for transport by a highway vehicle to an unloading site. At the unloading site, at least one of the end doors of the container is opened and a discharge outlet for the pneumatic conveying apparatus is removably connected adjacent the rear end of the container for unloading of the container. The inner end of the lower tubular extension or spout of the bag is sealed at its juncture with the bag by a sealing membrane defined by the portion of the bag covering the inner end of the lower spout. This sealing membrane must be cut or removed in order for the lading to be unloaded from the plastic bag. Thus, the lading is tightly sealed upon loading within the plastic bag, and the plastic bag remains in a sealed condition until it is opened by slitting the membrane for gravity discharge directly into a pneumatic conveyor through the discharge outlet at the unloading site. The container or the plastic bag is not pressurized in any manner during unloading and the plastic bag collapses as the lading is removed or discharged. Thus, loss of lading after being loaded within the plastic bag in the container until the loading is discharged into the pneumatic unloading system at the unloading site is minimized.

The pneumatic conveying apparatus and the connecting lading conduits between the rear end of the container and the pneumatic conveying apparatus are positioned between the rear end of the container and the rear tandem wheels in order to permit an effective and satisfactory gravity unloading of particulate lading from the rear end of the tilted container to a rotary valve which feeds the particulate lading into an air stream in a lower pneumatic hopper for pneumatic conveyance to a storage site such as a silo, for example.

The rotary valve and a throttling valve together with connecting lading conduits extend between the rear end of the container and the pneumatic conveying conduit below the rotary valve. Thus, a substantial distance of several feet is provided between the pneumatic conveying conduit and the rear end of the container. It is possible that a very small amount of contamination could occur with the passage of lading through the rotary valve and the connecting lading conduits to the pneumatic converging conduit beneath the rotary valve.

It is desired that the particulate material flow from the container directly to the pneumatic conveying conduit in a minimal distance and without passage through a rotary valve which may also at times possibly damage some of the plastic pellets by contact with the vanes of the rotary valve, for example.

SUMMARY OF THE INVENTION

The present invention is directed generally to a container unloading system for unloading particulate material from a container removably supported on a highway trailer with the particulate material being stored in a sealed plastic bag within the container. The plastic bag is filled with lading inside a container and the plastic bag is then sealed for transport. The lading may comprise plastic pellets, grain, pellets, foodstuff, or the like. The container has a rear end bulkhead adjacent a pair of rear doors which are opened for unloading of the container. The plastic bag is supported against the rear bulkhead.

The particulate material is unloaded from the plastic bag by gravity upon tilting of the front end of the container to a desired angle, generally greater than the angle of repose of the lading being unloaded. A rear discharge fitting is secured to and extends through an opening in the rear bulkhead to provide a connection for an unloading device upon opening of the rear doors of the container. A removable vacuum unloading device is removably connected to the discharge fitting at the unloading site for the unloading of the particulate material from the container.

The vacuum unloading device which forms an important part of this invention includes a pair of substantially rigid tubular conduits secured to each other in a perpendicular relation and in fluid communication. A first tubular conduit is connected to the discharge fitting on the bulkhead upon opening of the rear doors of the container for receiving particulate material from the container. The other tubular conduit which extends in a horizontal direction transversely of the longitudinal axis of the container is connected to a pressurized pneumatic source for exerting a vacuum on the first conduit to draw particulate material therefrom for conveyance to a suitable storage site. A manually operated butterfly valve member is provided in the first conduit to control the flow of particulate material from the container. Another manually operated control valve is mounted in the pneumatic conduit upstream of the first conduit to control the vacuum and flow of air along the pneumatic conduit.

In order to commence the flow of particulate material from the container, the first conduit has a door movable manually to an open position to permit manual access to the interior of the conduit and the discharge fitting which is adjacent the plastic bag. A workman, upon opening of the door, manually reaches inside the first conduit which is connected to the discharge fitting and then reaches through the discharge fitting with a cutting device, such as a knife, to slit the plastic bag adjacent the discharge fitting. After the bag has been slit or punctured to start the flow of particulate material into the discharge fitting, the workman then withdraws the knife from the interior of the first conduit and closes the door. Then, upon tilting of the container to the desired angle, such as the angle of repose of the particulate material being unloaded, the flow of particulate lading into the conduits of the vacuum unloading device commences controlled by the butterfly valve members on the conduits.

The first conduit extending from the discharge fitting on the rear end of the container to the pneumatic conduit is relatively short and extends a distance less than about two feet. Thus, a small travel distance in a straight direction is provided for the particulate lading when conveyed from the container to the pneumatic conduit. Such a small travel distance practically eliminates any contamination of the particulate material or lading being unloaded and the only valve member or obstruction in the conduit is a butterfly valve member which provides minimal obstruction to the particulate material.

It is the object of the invention to provide a container unloading system for the gravity unloading of particulate material from the container upon upward tilting of the front end of the container in which minimal contamination and damage to the particulate material is provided.

It is a further object of the invention to provide in a dense phase vacuum air conveying system a vacuum unloading device which is removably connected to the rear end of the container at an unloading site and provides a minimal travel distance of the particulate material from the container to a pneumatic conduit for transport.

A further object of the invention is to provide such a vacuum unloading device having a pair of rigid tubular conduits secured to each other in a perpendicular relation with one of the conduits providing manual access to a discharge fitting on the rear end of the container to permit slitting or puncturing of a plastic bag containing the particulate material for commencing flow of the particulate material upon tilting of the front end of the container.

Other objects, features and advantages of the invention will become more apparent after referring to the following specification and drawings.

BRIEF DESCRIPTION OF THE DRAWINGS

FIG. 4 is an elevational view similar to FIG. 3 but showing the container tilted for gravity unloading of the particulate material within the container;

FIG. 5 is a sectional view of the vacuum unloading device removably mounted on the container for unloading; and FIG. 6 is a sectional view taken generally along line 6—6 of FIG. 5 and showing the door to permit manual slitting of the plastic bag.

DESCRIPTION OF THE INVENTION

Figure 1:
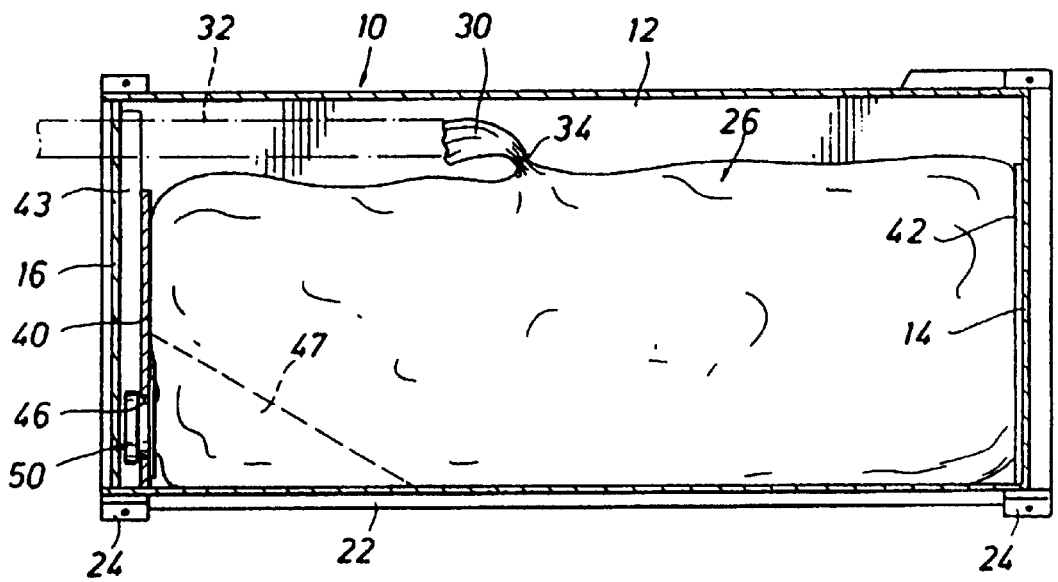
FIG. 1 is a sectional view of a container in accordance with the present invention showing a plastic bag in the container in a sealed condition loaded with particulate lading and positioned adjacent a rear end bulkhead.
Figure 2:
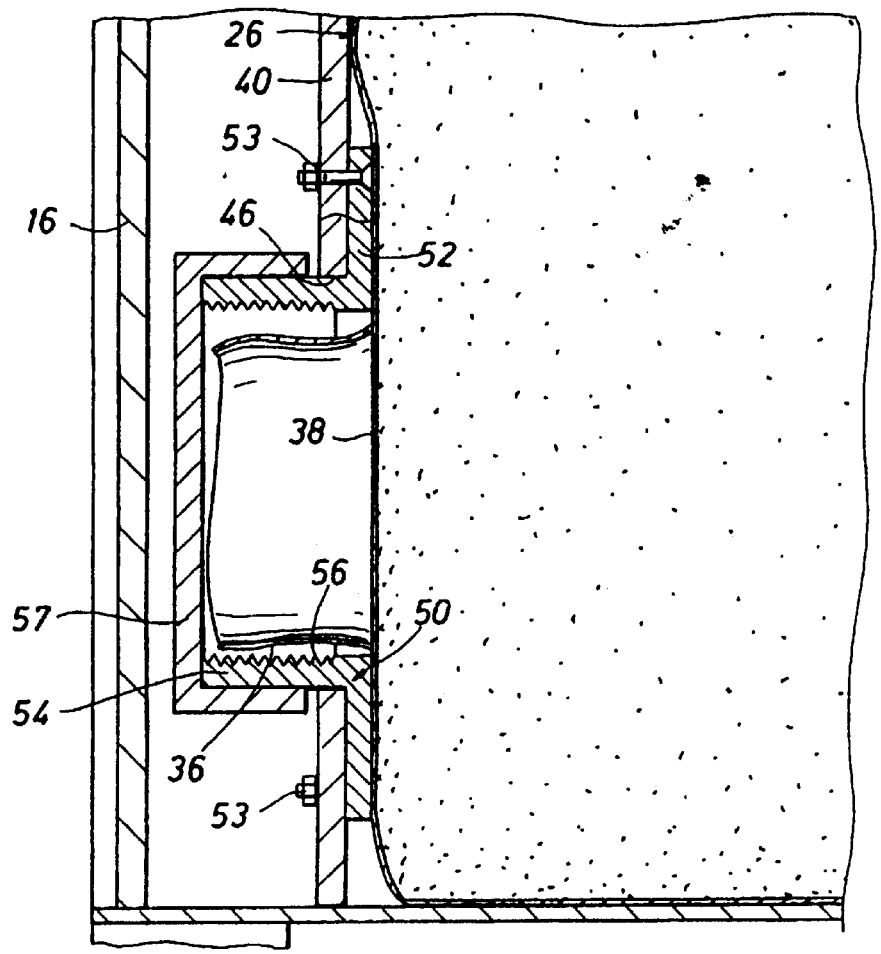
FIG. 2 is an enlarged view of a tubular discharge fitting secured to a rear end bulkhead in the container and extending therethrough for connection to a vacuum unloading device of the present invention.
Figure 3:
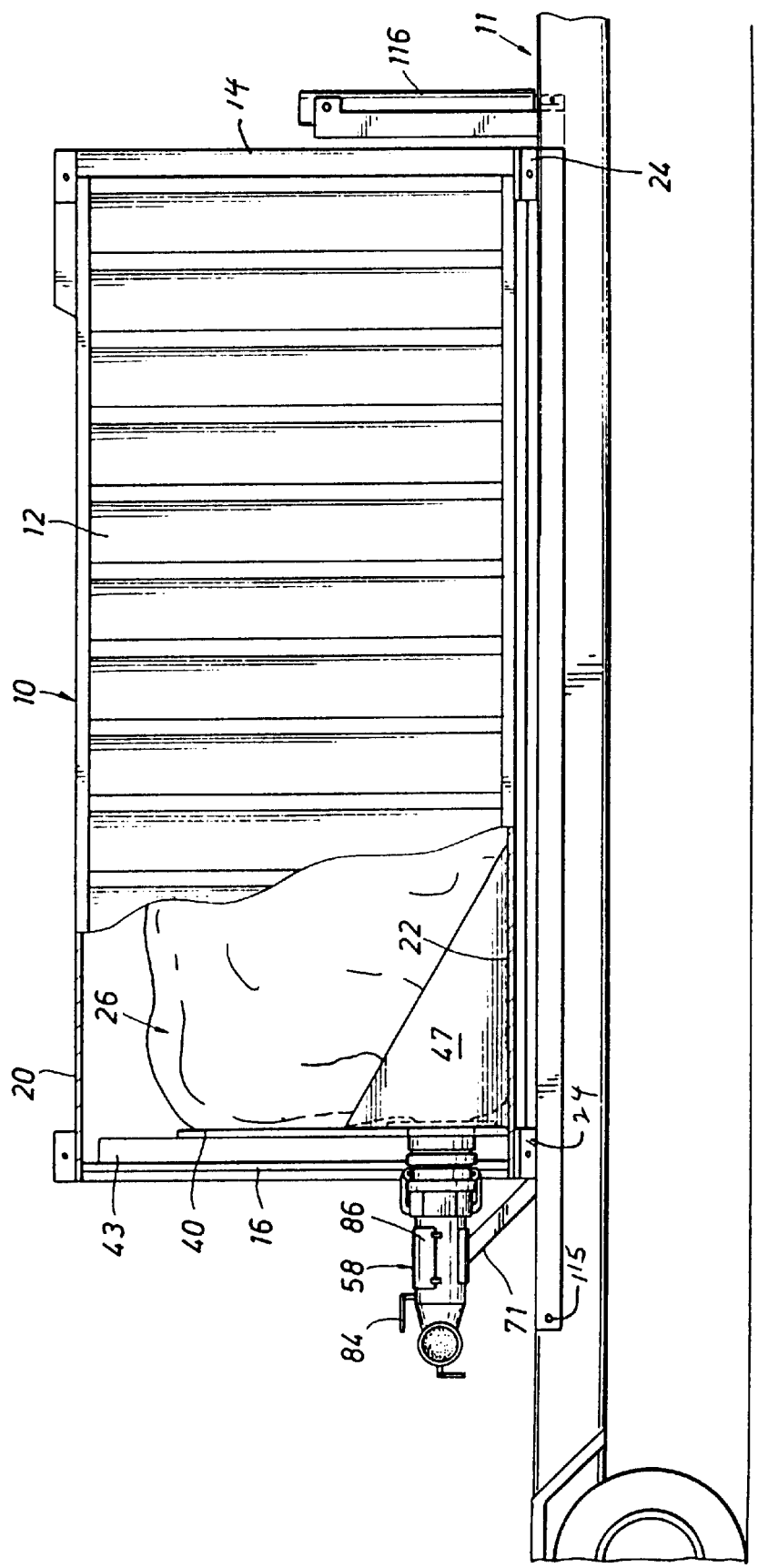
FIG. 3 is an elevational view of the container on a highway trailer with the vacuum unloading device mounted on the container for unloading and the trailer having a tiltable container support frame thereon for tilting of the front end of the container.

Referring now to the drawings for a better understanding of the invention, FIGS. 1 and 2 show a container 10 and FIG. 3 shows container 10 mounted on a highway trailer generally indicated at 11 for surface transportation. Container 10 is preferably a standard container such as twenty (20) feet in length used in intermodal transportation, such as in so-called COFC (container on flat car) service, container ships, or highway trailers, and has a pair of sides 12 connected by an end 14 at one end. The other end of container 10 has a pair of doors 16 hinged for movement between open and closed positions. Doors 16 may be releasably latched together in closed position. Only one door 16 is required to be opened for unloading. Container 10 has a top 20 and a bottom 22. Mounted on the corners of bottom 22 are corner fittings 24 which have suitable openings therein adapted to receive locking pins for releasably mounting container 10 onto supporting transport means, such as highway trailer 11.

Container 10 of the present invention is preferably utilized with highway vehicles and with the transport of particulate lading, such as plastic pellets used in the manufacture of various end products. The particulate material is normally transported from one site where the particulate material is made to a plant at another site where the end products are made from the particulate materials. It is highly desirable that such materials not be contaminated with foreign matter as the quality of the end product may be affected. Thus, it is desirable that the lading be sealed from the environment after being loaded into container 10 until unloading at an unloading site for conveyance to a storage facility where the particulate material enters a process for making the end product. For this purpose, a plastic bag generally indicated at 26 and formed of polyethylene having a thickness of around 0.012 inch, for example, is placed within container 10 to receive the lading therein. Bag 26, as shown particularly in FIG. 1 has an upper tubular extension or boot 30 which receives a flexible discharge hose shown in broken lines at 32 for discharge of particulate lading into bag 26. After filling of bag 26, tubular extension 30 is sealed by a band 34. It is noted that a lower tubular extension or spout 36 is provided as shown particularly in FIG. 2 and a membrane or closure 38 closes spout 36. For unloading of the particulate lading from bag 26 the closure 38 is slit or punctured.

A portable subassembly in container 10 for supporting bag 26 may be provided comprising a pair of opposing end bulkheads 40 and 42 of a generally rectangular shape. Bulkheads 40 and 42 are preferably formed of multiple layers of cardboard or plywood and the ends of bags 26 are secured to opposed bulkheads 40 and 42 to provide a collapsible pack prior to positioning within container 10. Bag 26 is expanded by bulkhead 40 and 42 for loading. Rear bulkhead 40 which may be supported by mounting strips 43 on container sides 12 is mounted adjacent rear doors 16 of container 10 and has an opening 46 therethrough. In order to prevent or minimize lading from collecting in the corners adjacent opening 46, suitable diverging cardboard wing members 47 may be provided adjacent opening 46 to direct the lading in bag 26 toward discharge opening 46 thereby providing a maximum clean out of lading from container 10 and plastic bag 26.

A lading discharge tubular fitting generally indicated at 50 is mounted within opening 46 adjacent one of the rear doors 16. Tubular fitting 50 has an inner flange 52 secured to bulkhead 40 by fasteners 53 and a tubular body 54 internally threaded at 55 extends through opening 46 in bulkhead 40. A suitable removable cover 57 may be positioned over fitting 50 and maintained therein prior to unloading of the lading. Other suitable closures may be provided for fitting 50, if desired, such as a plug held by removable string ties, for example. Upon opening of the rear door 16 of container 10 adjacent fitting 50, tubular fitting 50 is accessible for connection to a suitable discharge apparatus for unloading of particulate material from container 10 and plastic bag 26.

A vacuum unloading device shown generally at 58 is constructed for removable attachment to tubular fitting 50 as shown in FIGS. 3–5. Vacuum unloading device 58 includes a pair of rigid conduits 60 and 62 secured to each other in a perpendicular relation. Conduit 60 comprises a lading conduit and conduit 62 comprises a pneumatic conduit. Conduit 60 has an externally threaded inner end 64 arranged to receive an internally threaded coupler 66 having pivoted cam lock handles 68 with cams 70 on their inner ends. A tubular adaptor 72 has an annular groove 74 adjacent to the outer end to receive cam 70 in locking relation upon actuation of handles 68. Inner end 76 is externally threaded for engaging internal threads 56 of tubular discharge fitting 50. Conduit 60 has a manually operated butterfly valve 80 having a shaft 82 and a handle 84 is secured to shaft 82 for manual rotation of valve 80. For connection of vacuum unloading device 58, coupling 66 is threaded onto externally threaded end 64 of conduit 60 and adaptor 72 is threaded within tubular discharge fitting 50. Then, coupling 66 is slipped over adaptor 72 with handles 68 in open position. Handles 68 are then manually pulled downwardly to engage cams 70 in groove 74. To support vacuum unloading device 58 in an unloading position, a removable support bracket 71 is detachably mounted at the unloading site beneath vacuum unloading device 58 and container 10. In some instances, it may be desirable to support vacuum unloading device 58 from a removable horizontal bar on the deck of trailer 11 with a pivotal conduit support between the bar and the lower surface of conduit 60 for permitting pivotal movement of container 10.

To provide manual access to spout 36 and membrane 38 of plastic bag 26 for slitting or puncturing membrane 38 to commence the flow of plastic material from sealed bag 26, an arcuate access door or hatch 86 is hinged at 88 to conduit 60 and covers an opening 90 as shown in FIGS. 5 and 6. Clamping levers 92 are pivoted on conduit 60 and releasably secured by rotation to lugs 94 on door 86. Upon opening of door 86, a workman can reach within conduit 60 and tubular fitting 50 and slit or puncture membrane 38 with a knife such as illustrated at 95 in FIG. 5 for unloading of the particulate material. The total length of conduit 60 is less than two feet and thus, the particulate material travels a minimal distance in a straight direction from container 10 to pneumatic conduit 62 for discharge.

Pneumatic conduit 62 has a butterfly valve 96 upstream of lading conduit 60 having a shaft 98 and a manual operating handle 100. A conically shaped filter 102 is mounted in conduit 60 upstream of butterfly valve 96 and is formed of a number ten (10) mesh screen on a mounting on ring 104 retained by retainer 106. A suitable flexible air supply is hose 108 is connected between an air source, such as a compressor on trailer 11, and upstream inlet end of conduit 62. The connection for air supply hose 108 is also effective for maintaining retainer 106 in position. A discharge hose 110 is connected downstream to the outlet end of conduit 62 for delivery of the particulate lading by compressed air to a suitable storage on handling facility. The supply of the particulate material is controlled by manual operation of butterfly valve 80 and the supply of air through conduit 62 is controlled by the manual operation of butterfly valve 96. The flow of the compressed air in conduit 62 when passing conduit 60 exerts a vacuum on conduit 60 to draw the particulate lading from conduit 60 into the stream of air moving through conduit 62.

Container 10 is supported on a platform generally indicated 114 mounted on the deck of highway trailer 11 for pivotal movement about horizontal axis 115 on the trailer body forwardly of the rear tandem axles. A power cylinder shown at 116 on trailer 11 is connected to the front end of platform 114 and is effective for tilting the front end of container 10 on trailer 11 to a desired angle for gravity unloading of the particulate lading from container 10 as shown in FIG. 4. Container 10 is normally tilted at an angle slightly greater than the angle of repose of the particulate material being unloaded. The longitudinal axis of conduit 60 is in alignment with the longitudinal axis of container 10 so that the particulate material moves axially in a single direction from container 10 to pneumatic conduit 62.

Operation

In operation at an unloading site, a workman unlatches rear doors 16 to expose tubular discharge fitting 50 in the rear bulkhead 42. Adaptor 72 is connected to the discharge fitting 50. Vacuum unloading device 58 is connected to coupler 66. Then, coupler 66 is slipped over adaptor 72 and handles 68 are pulled downward with cams 70 engaging groove 74. A suitable bracing bracket 71 is detachably connected between vacuum unloading device 58 and platform 114 to support the projecting unloading device 58. Pressurized air supply hose 108 is connected between a compressor on trailer 11 and conduit 62. A discharge hose 110 is connected to the outlet end of conduit 62 for delivery of particulate lading to a suitable storage facility. In this position, door or hatch 86 is opened and a workman reaches inside conduit 60 and through discharge fitting 50 with a knife, or other suitable instrument, for slitting or puncturing membrane 38 of plastic bag 26 with spout 36 being positioned within fitting 50. The workman then withdraws the slitting instrument from conduit 60 and closes door 86. In this position, the engine for trailer 11 is started for powering the air compressor and the hydraulic pump for cylinder 116 for tilting the rear end of platform 114 and container 10 about pivot 115 to an angle slightly greater than the angle of repose of the particulate material being unloaded from container 10 for gravity unloading. The compressed air supply through conduit 62 is controlled by butterfly valve 96 for drawing the stream of particulate material from conduit 60 into conduit 62 for pneumatic transport. Butterfly valve 80 is manually controlled for controlling the flow of particulate material into conduit 62. A negligible amount of lading remains in container 10 after unloading. Thus, minimal unloading time is required and minimal lost lading is provided by the system of the present invention. A minimal straight travel distance is provided between container 10 and pneumatic conduit 62 so that any contamination or deterioration of the particulate material being unloaded is substantially eliminated. For further details, reference is made to U.S. Pat. No. 4,875,811 dated Oct. 24, 1989, the entire disclosure of which is incorporated by this reference.

While the preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. Apparatus for the gravity unloading of particulate material from a sealed plastic bag in a container mounted on a highway trailer upon tilting of the container a desired amount, the rear end of the container having a rear bulkhead for supporting the plastic bag; said apparatus comprising:

a connecting fitting for mounting on said bulkhead and for extending therethrough;

a vacuum unloading device detachably connected to said fitting, said vacuum unloading device including a pair of substantially rigid tubular conduits secured to each other at a desired angle and in fluid communication with each other, one of said tubular conduits being a lading conduit for receiving particulate material from the container, the other tubular conduit being a pneumatic conduit extending in a horizontal direction transversely of the longitudinal axis of said trailer and connected to a pressurized pneumatic source for exerting a vacuum on said one tubular conduit to draw the particulate material therefrom for conveyance along said other conduit, and a manually operated flow control member on said one tubular conduit to control the flow of particulate material from said container to said other conduit.

2. An apparatus as defined in claim 1 further comprising:

a manually operated flow control member in said pneumatic conduit upstream of said one conduit to control the flow of air along said pneumatic conduit.

3. An apparatus as set forth in claim 2, further comprising:

a filter in said pneumatic conduit upstream of said manually operated flow control member in said pneumatic conduit.

4. An apparatus as defined in claim 1, wherein said tubular conduits are secured to each other in a perpendicular relation, and said one conduit has a door therein movable to an open position to permit manual access to said connecting fitting and plastic bag.

5. An apparatus as set forth in claim 1, wherein said one conduit has a longitudinal axis in alignment with a longitudinal axis of said container and moves with said container upon tilting of said container for unloading.

6. A vacuum unloading device constructed and arranged for removable attachment to the rear end of a container mounted on a highway trailer for tilting to a desired angle for gravity unloading of particulate material from an opening in the rear end of the container; said vacuum unloading device comprising:

a pair of rigid tubular conduits secured to each other in a perpendicular relation and in fluid communication with each other;

one of said rigid tubular conduits arranged for receiving particulate material from the container;

the other rigid tubular conduit arranged for connection to a pressurized air source;

a manually operated butterfly valve in said one rigid tubular conduit for controlling the flow of particulate material; and a manually operated butterfly valve in the other rigid tubular conduit for controlling the flow of air therethrough.

7. A vacuum unloading device as defined in claim 6, further comprising:

a door of an arcuate shape on said one rigid tubular conduit movable between open and closed positions, said door in an open position providing manual access to the interior of said one rigid tubular conduit.

8. A vacuum unloading device as defined in claim 7, further comprising:

a coupler having a cam lock on one end thereof and threaded at one end onto said one rigid tubular conduit, and an adaptor arranged for connection to an opposed end of said coupler at one end thereof and for connection to the container at an opposite end thereof.

* * * * *